April 18, 1933.  G. F. TAYLOR  1,904,568
DISK LIKE CUTTING TOOL
Filed May 14, 1929
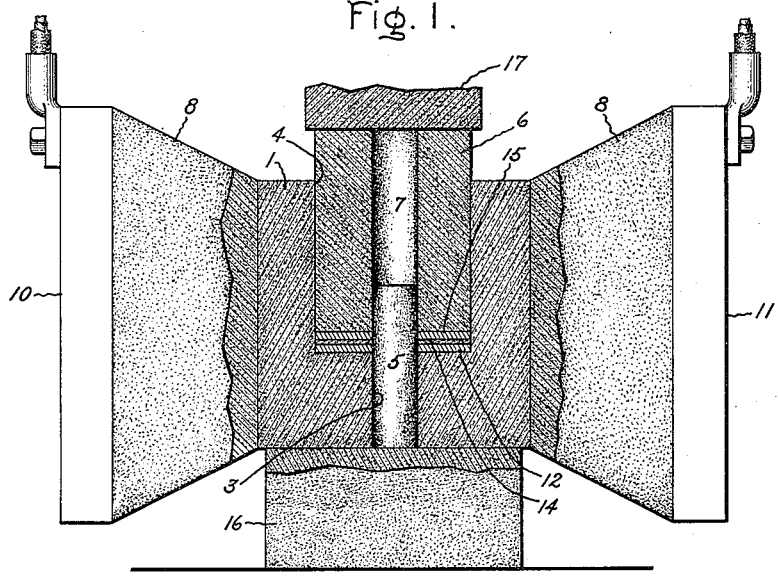
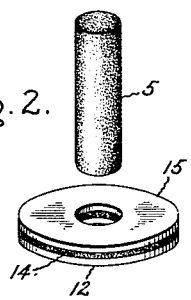
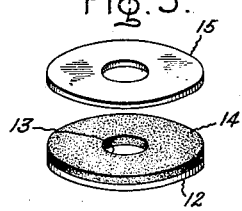
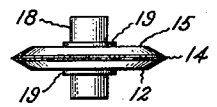
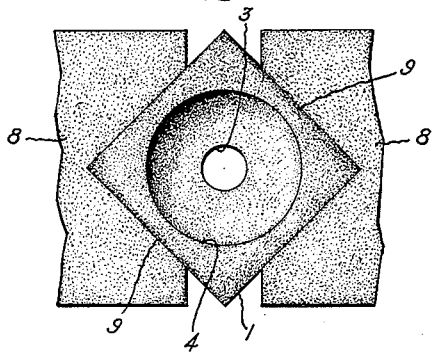
Inventor:
George F. Taylor,
by Charles E. Mullan
His Attorney.

Patented Apr. 18, 1933

1,904,568

UNITED STATES PATENT OFFICE

GEORGE F. TAYLOR, OF SCHENECTADY, NEW YORK, ASSIGNOR TO GENERAL ELECTRIC COMPANY, A CORPORATION OF NEW YORK

DISK-LIKE CUTTING TOOL

Application filed May 14, 1929. Serial No. 363,079.

The present invention relates to cutting tools and more particularly to thin disk-like tools made from a sintered hard metal composition which consists largely of tungsten-carbide, but contains an appreciable amount of an auxiliary cementing metal having a lower melting point than the carbide, for example cobalt. A sintered composition of this character, known as cemented carbide, is described in the patent to Schröter No. 1,549,615 and, in general, consists of a carbide of an element of the 6th group of Mendelejeff's periodic table, for example tungsten-carbide or molybdenum-carbide and a cementing or binder metal of the iron group, such as cobalt. The composition usually contains about 3 to 25% cobalt and preferably about 13% cobalt, the remainder of the composition being substantially tungsten-carbide.

In the copending application of Samuel L. Hoyt, Serial No. 181,536, filed April 6, 1927, now Patent No. 1,843,768, there is disclosed a method for forming a composition, such as disclosed in the present application, into a dense, hard and tough mass by the simultaneous application of heat and pressure to the composition. According to the prior process, the material to be treated is placed in a carbon mold and pressed between carbon plungers while heated to its sintering temperature, the pressure applied being approximately 1000 pounds per square inch.

I have found that when very thin disks of this material, for example disks having a thickness of about 1/64", are formed according to the prior process, such disks are somewhat coarse grained and will not take a smooth, sharp edge, for example the edges break or chip easily in the grinding process.

It is one of the objects of the present invention to provide a disk-like cutting tool of this material having a sharp smooth cutting edge. Such tools may be employed as glass cutters and like devices. Although I have illustrated the invention in connection with a glass cutter, it will be clear that the invention is not restricted to that particular type of tool.

In carrying out my invention, I thoroughly mix tungsten-carbide and cobalt in the proportion of about 3 to 25% cobalt and about 97 to 75% tungsten-carbide. The powdered materials are placed between relatively soft metal disks, such as molybdenum, which are substantially co-extensive in area with the cutting disk to be formed. Pressure is applied to the intermediate powdered materials while they are simultaneously heated to their sintering temperature. The powdered materials are compacted by this operation into a dense thin layer or disk of sintered material approximately 1/64" in thickness and of extraordinary hardness which is welded to the outer relatively soft molybdenum disks during the pressing and heating operation.

The composite disk thus formed and comprising a central or intermediate hard, sintered disk and outer relatively soft molybdenum disks may be given a sharp, smooth edge by grinding or bevelling the edges of the outer disks and the central disk so that the outer edge of the central disk forms the apex of an angle which includes the bevelled edges of the outer disk.

Ordinarily, it would be very difficult to provide a sintered disk of this thickness with a suitable cutting edge owing to its somewhat brittle nature. When backed up by the relatively soft molybdenum supporting disks however, this difficulty is overcome and the central disk provided with a very sharp, smooth cutting edge.

The novel features which are characteristic of my invention are set forth with particularity in the appended claims. The invention itself however will best be understood from reference to the following specification when considered in connection with the accompanying drawing in which Fig. 1 represents a view partly in section and partly in elevation of an apparatus for forming a composite disk tool, such as a glass cutter, in accordance with the present invention; Fig. 2 is a perspective view of a glass cutter before the edge portion thereof has been ground, together with a plug adapted to fit in a central opening of the tool during the pressing operation; Fig. 3 is a perspective view of the composite tool disk with the outer disk slightly removed; Fig. 4 is a view in elevation of a completed glass cutting tool, while Fig. 5 is a cross-sectional view, partly broken away, of the lower portion of the apparatus shown in Fig. 1.

Referring more particularly to Fig. 1 of the drawing, I have shown at 1 a rectangular carbon mold having a central cylindrical opening extending through the mold, the lower part 3 of the opening being of relatively small diameter, and the upper part 4 of relatively large diameter and extending more than half-way through the mold. A refractory carbon plug 5 fills the central opening 3 in the mold and extends an appreciable distance into the opening 4. A carbon plunger 6 fits into the opening 4 of the mold and has an opening 7 to accommodate the carbon plug 5 which slides therein. The mold 1 is positioned between two carbon cheeks 8 provided with right-angled openings 9 therein to accommodate the mold. A pair of electric terminals 10 and 11 bear against the cheeks 8. Pressure may be applied to these terminals in any suitable manner to clamp the mold 1 firmly between the cheeks 8.

In carrying my invention into effect, I usually mix tungsten-carbide and cobalt in the proportion of about 13% cobalt and about 87% tungsten-carbide and sprinkle it over a molybdenum or other suitable plate 12 which is relatively soft but has a relatively high melting point. The plate is provided with a central opening or perforation 13. If desired, the powdered material may be mixed with a small amount of water or starch paste and applied to the disk 12, as in my copending application Serial No. 357,536, filed April 23, 1929. The thickness of the powdered material 14 on the plate 12 will usually be about five times the thickness desired in the finished product, i. e., if a sintered cutting disk 1/64" is desired the powdered material placed on the disk 12 prior to the application of pressure thereto should be approximately 5/64" in thickness. The late 12 with the powdered material thereon is placed in the opening 4 of the mold 1 and plug 5 inserted in the opening 3 so as to extend through the central opening in the disks. An upper perforated molybdenum disk 15 is then placed on top of the powdered material and the pressure member 6 inserted in the opening 4 of the mold. The mold is then clamped firmly between the cheeks 8 and placed on a support 16 and under the plunger member 17 of a press. Pressure equal to about 1000 pounds per square inch is applied by the press to the powdered materials, while the powdered materials are simultaneously heated to their sintering temperature by means of an electric current supplied through the electric terminals 10 and 11.

A current of about four to five thousand amperes at about 7 volts applied for a few minutes heats the powdered materials to a temperature in the neighborhood of about 1375° C. which is the sintering temperature of the powdered materials. The simultaneous application of pressure and heat to the powders produces a very dense product and at the same time welds the outer molybdenum plates 12 and 15 to the intermediate sintered disk. During the pressing operation the carbon plug 5 prevents expansion of the central disk 14 inwardly towards the center of the disk.

After removal from the mold, the outer edges of the composite disk may be ground or bevelled as indicated in Fig. 4, the edge of the central disk being ground so as to form the apex of an angle which includes the bevelled edges of the outer disks.

Since the particular tool employed to illustrate my invention is a glass cutter the central opening through the composite disk is fitted with a steel rod 18 which may be driven through the central opening of the disk or, if desired, copper brazed in the central opening of the disk. The steel rod 18 provides means whereby the glass cutter may be rotatably mounted in a suitable holder. In order to prevent wear on the molybdenum disk by the holders, washers 19 may be fitted on the steel rod or shaft 18 so as to rest against the outer molybdenum plates.

What I claim as new and desire to secure by Letters Patent of the United States, is:

1. An article of manufacture comprising a pair of metal disks and an intermediate sintered disk consisting largely of a hard metal carbide and a binder material therefor, said intermediate disk being welded to said outer disks.

2. A sintered metallic disk consisting largely of a hard metal carbide and a binder material therefor having a sharp cutting edge, a supporting disk for said sintered disk, said disks being substantially coextensive in area.

3. A sintered disk consisting largely of a hard metal carbide and a binder material therefor having a sharp cutting edge and a supporting disk welded to said sintered disk, said disks being substantially coextensive in area and having aligned openings therethrough for a supporting member.

4. A cutting implement comprising two outer disks of relatively soft metal and an intermediate disk of relatively hard material, said intermediate disk consisting largely of a hard metal carbide and a binder material therefor, said intermediate disk being reduced in thickness at its periphery to thereby provide a cutting edge.

5. A cutting implement comprising two outer disks of relatively soft material and an intermediate disk, said intermediate disk consisting substantially of a sintered composition of tungsten-carbide and cobalt and having a cutting edge extending beyond said outer disks.

6. The method of forming a disk-like cutting implement which comprises placing powdered materials consisting largely of tungsten but containing appreciable amounts of carbon and cobalt between two substantially flat and relatively soft metal disks, and applying pressure to said disks to compress the powdered materials while simultaneously heating them to their sintering temperature.

In witness whereof, I have hereunto set my hand this 13th day of May, 1929.

GEORGE F. TAYLOR.